United States Patent
Kim et al.

(10) Patent No.: US 11,815,483 B2
(45) Date of Patent: Nov. 14, 2023

(54) METHOD FOR DETERMINING THE DEUTERIUM SUBSTITUTION RATE ACCORDING TO SUBSTITUTION POSITIONS

(71) Applicant: LG Chem, Ltd., Seoul (KR)

(72) Inventors: Eunhee Kim, Daejeon (KR); Sooyoung Kwak, Daejeon (KR); Young Hee Lim, Daejeon (KR); Yu Ra Lee, Daejeon (KR)

(73) Assignee: LG Chem, Ltd.

( * ) Notice: Subject to any disclaimer, the term of this patent is extended or adjusted under 35 U.S.C. 154(b) by 381 days.

(21) Appl. No.: 17/315,850

(22) Filed: May 10, 2021

(65) Prior Publication Data

US 2021/0364456 A1  Nov. 25, 2021

(30) Foreign Application Priority Data

May 25, 2020 (KR) .................. 10-2020-0062458
Dec. 22, 2020 (KR) .................. 10-2020-0181330

(51) Int. Cl.
  *G01N 24/08* (2006.01)
(52) U.S. Cl.
  CPC .................. *G01N 24/088* (2013.01)
(58) Field of Classification Search
  CPC .................................................. G01N 24/088
  See application file for complete search history.

(56) References Cited

U.S. PATENT DOCUMENTS

2020/0212306 A1* 7/2020 Konishi ............... C08F 212/32
2021/0350882 A1* 11/2021 Kwak ..................... G16C 20/20

FOREIGN PATENT DOCUMENTS

| JP | H08245963 A | * | 9/1996 |
| JP | 2009137911 A | | 6/2009 |
| JP | 2009269825 A | | 11/2009 |
| JP | 2010256104 A | | 11/2010 |
| KR | 100371908 B1 | | 2/2003 |
| KR | 20170025869 A | | 3/2017 |
| KR | 101958900 B1 | | 3/2019 |

OTHER PUBLICATIONS

Reese, et al, "Detection of deuterium labelling by two-dimensinal 1H,13C nuclear magnetic resonance shift correlation with 2H decoupling." Canadian Journal of Chemistry, vol. 64, pp. 1427-1433.

* cited by examiner

*Primary Examiner* — G. M. A Hyder
(74) *Attorney, Agent, or Firm* — Lerner David LLP

(57) ABSTRACT

The present disclosure relates to a method for analysis of a deuterium substitution rate of a deuterium-substituted sample according to substitution positions using information of a $^1$H-NMR spectrum of the deuterium-substituted sample.

5 Claims, 1 Drawing Sheet

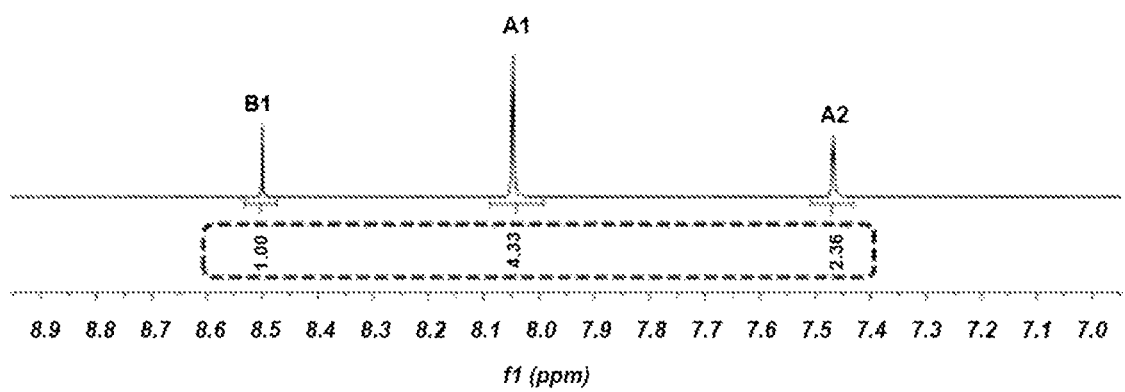

METHOD FOR DETERMINING THE DEUTERIUM SUBSTITUTION RATE ACCORDING TO SUBSTITUTION POSITIONS

CROSS-REFERENCE TO RELATED APPLICATION(S)

This application claims the benefit of Korean Patent Applications No. 10-2020-0062458 filed on May 25, 2020 and No. 10-2020-0181330 filed on Dec. 22, 2020 with the Korean Intellectual Property Office, the disclosures of which are incorporated herein by reference in their entirety.

BACKGROUND OF THE INVENTION

(a) Field of the Invention

The present disclosure relates to a method for determining the a deuterium substitution rate of a deuterium-substituted sample according to substitution positions using information of a $^1$H-NMR spectrum of the deuterium-substituted sample.

(b) Description of the Related Art

In general, an organic light emitting phenomenon refers to a phenomenon converting electrical energy to light energy by using an organic material. The organic light emitting device using the organic light emitting phenomenon has characteristics such as a wide viewing angle, an excellent contrast, a fast response time, excellent luminance, driving voltage and response speed, and thus many studies have proceeded.

The organic light emitting device generally has a structure including an anode, a cathode, and an organic material layer interposed therebetween. The organic material layer frequently have a multilayered structure formed with different materials in order to enhance efficiency and stability of the organic light emitting device, and for example, the organic material layer may be formed of a hole injection layer, a hole transport layer, a light emitting layer, an electron transport layer, an electron injection layer and the like. When a voltage is applied between two electrodes in the structure of the organic light emitting device, holes and electrons are injected to the organic material layer from the anode and the cathode, respectively. And when the injected holes and electrons meet each other, excitons are formed, and light emits when these excitons fall back to the ground state.

There is a continuing demand for developing a new material for organic materials used in such organic light emitting devices, and recently, attempts have been made to improve characteristics such as lifespan of the organic light emitting device through deuterium substitution.

It is known that the lifespan of the organic light emitting device is improved as the deuterium substitution rate increases. However, since a deuterium solvent used for deuterium substitution is expensive, a method of increasing the deuterium substitution rate at minimal cost is required. In this process, a substitution position with the lowest deuterium substitution rate is identified, and then a reaction condition for increasing the deuterium substitution rate at that position is being studied. To this end, a method of analyzing the deuterium substitution rate of the deuterium-substituted sample according to substitution positions is required.

Accordingly, the present inventors intensively studied the analysis method for the deuterium substitution rate of the deuterium-substituted sample according to substitution positions, and confirmed that the above analysis is possible using information of a $^1$H-NMR spectrum of the deuterium-substituted sample as described later, thereby completing the present invention.

SUMMARY OF THE INVENTION

In the present disclosure, there is provided a method for determining the deuterium substitution rate of a deuterium-substituted sample according to substitution positions using information of a $^1$H-NMR spectrum of the deuterium-substituted sample.

In order to solve the above problems, there is provided the following analysis method:

A method for determining the deuterium substitution rate of a deuterium-substituted sample according to substitution positions, including the steps of:

obtaining a $^1$H-NMR spectrum of the deuterium-substituted sample (step 1); and calculating a deuterium substitution rate ($[D\%]_p$) of the deuterium-substituted sample according to substitution positions from the following Equation 1 using information of the $^1$H-NMR spectrum (step 2):

$$[D\%]_p = 100 - ((100 - [D\%]) \times A_p \times H)/(A \times H_p) \quad \text{[Equation 1]}$$

in Equation 1,

[D %] is an average deuterium substitution rate of the deuterium-substituted sample, $A_p$ is an integration value of a peak at the position in the $^1$H-NMR spectrum, H is the total number of hydrogens in the deuterium-substituted sample before deuterium substitution, A is the sum of integration values of each peak in the $^1$H-NMR spectrum, $H_p$ is the number of hydrogens at the position in the deuterium-substituted sample before deuterium substitution.

The present disclosure relates to a method for analysis of a deuterium substitution rate according to substitution positions of the deuterium-substituted sample through a $^1$H-NMR spectrum of the deuterium-substituted sample under the assumption that the average deuterium substitution rate of the deuterium-substituted sample is known.

Hereinafter, the present disclosure will be described in detail for each step.

(Step 1)

The step 1 is to obtain a 1H-NMR spectrum of a deuterium-substituted sample.

The deuterium-substituted sample refers to a sample in which deuterium is substituted at least one position where hydrogen can be substituted in the molecular structure. In addition, the deuterium-substituted sample preferably has two or more positions where hydrogen can be substituted in the molecular structure. The deuterium-substituted sample may be commercially available, or may be prepared by substituting with deuterium according to a conventionally known method.

The $^1$H-NMR spectrum is for obtaining an integration value of a peak at each position in Equation 1 to be described later. Therefore, the method is not particularly limited as long as the peak at each position in the deuterium-substituted sample can be obtained. In the $^1$H-NMR measurement, the peak at each position in the deuterium-substituted sample can be obtained by adjusting conditions such as pulse sequence, the number of scans, delay time, acquisition time, and measurement temperature.

(Step 2)

The step 2 is to analyze the deuterium substitution rate of the deuterium-substituted sample according to substitution positions using the information obtained in step 1.

In the $^1$H-NMR spectrum, the integration value of the peak corresponding to each position decreases by the amount in which deuterium is substituted. Thus, the deuterium substitution rate at each position can be analyzed by calculating the amount of remaining hydrogen in consideration of the average deuterium substitution rate of the deuterium-substituted sample.

Specifically, the deuterium substitution rate of the deuterium-substituted sample according to substitution positions may be analyzed using Equation 1 above. For convenience of explanation, the following Equation 1 will be described in detail by taking deuterium-substituted anthracene as an example.

[D %] refers to an average deuterium substitution rate of the deuterium-substituted sample. The term "average deuterium substitution rate" used in the present disclosure refers to a rate in which deuterium is substituted for hydrogen in the chemical structure of a sample with respect to the entire sample. That is, it means the degree to which hydrogen present in the molecular structure of the deuterium-substituted sample before deuterium substitution is substituted with deuterium. The average deuterium substitution rate of the deuterium-substituted sample may be obtained by an analysis method of MS, GC/MS, or HPLC.

In addition, $A_p$ refers to an integration value of a peak at each position in the $^1$H-NMR spectrum, and is obtained in step 1. In Equation 1, the subscript p denotes a position in a molecule where deuterium is substituted in the deuterium-substituted sample, and is used to distinguish each position. For example, in the deuterium-substituted anthracene, three peaks are identified, and $A_{A1}$, $A_{A2}$, $A_{B1}$ denote integration values at each peak, respectively.

In addition, H refers to the total number of hydrogens in the molecular structure of the deuterium-substituted sample before deuterium substitution. For example, the deuterium-substituted anthracene has 10 hydrogens in total, so H is 10.

In addition, A refers to the sum of integration values of each peak in the $^1$H-NMR spectrum, and is obtained in step 1. For example, in the deuterium-substituted anthracene, three peaks are identified, and A denotes the sum ($A_{A1}$+$A_{A2}$+$A_{B1}$) of the integration values at each peak ($A_{A1}$, $A_{A2}$, $A_{B1}$).

In addition, $H_p$ refers to the number of hydrogens at each position in the molecular structure of the deuterium-substituted sample before deuterium substitution. For example, since the deuterium-substituted anthracene has three substitution positions, it has values of $H_{A1}$=4, $H_{A2}$=4, $H_{B1}$=2 according to substitution positions.

From the above information, each variable is substituted in Equation 1 to analyze the deuterium substitution rate according to substitution positions of the deuterium-substituted sample. A specific analysis method for this may be further specified in the following examples.

As described above, the present disclosure can analyze the deuterium substitution rate of the deuterium-substituted sample according to substitution positions using information of the $^1$H-NMR spectrum.

Further, there is provided a method for preparing an organic light emitting device comprising using the deuterium-substituted sample.

BRIEF DESCRIPTION OF THE DRAWINGS

FIGURE is a $^1$H-NMR spectrum of deuterium-substituted anthracene, which is a sample used in Example of the present disclosure.

DETAILED DESCRIPTION OF THE EMBODIMENTS

Hereinafter, the embodiment of the present invention will be described in more detail in the following examples. However, these examples are for illustrative purposes only, and the invention is not intended to be limited by these examples.

Example: Analysis of Deuterium Substitution Rate of Anthracene According to Substitution Positions The following experiment was performed using deuterium-substituted anthracene (Anthracene-d10; manufactured by Sigma-Aldrich; Product number 176591; CAS number 1719-06-8; average deuterium substitution rate: 99.1%).

$^1$H-NMR spectrum of the deuterium-substituted anthracene was measured, and the results are shown in FIGURE. The measurement conditions are as follows.

pulse sequence=zg30
number of scan (ns)=32
relaxation delay (d1)=10.0 sec
acquisition time (aq)=2.3 sec
temperature=298 K The information in Table 1 below was obtained from FIGURE. As shown in Table 1 below, A1, A2, and B1 refer to positions at which deuterium is substituted in anthracene, respectively.

TABLE 1

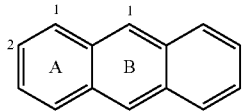

| | |
|---|---|
| Sum of integration values of each peak in $^1$H-NMR spectrum | A: 7.69 |
| Total number of protons in structure before deuterium substitution | H: 10 |
| Integration value corresponding to each peak | $A_{B1}$: 1.00 |
| | $A_{A1}$: 4.33 |
| | $A_{A2}$: 2.36 |
| Number of protons corresponding to each peak | $H_{B1}$: 2 |
| | $H_{A1}$: 4 |
| | $H_{A2}$: 4 |
| Avg. deuterium substitution rate | D %: 99.1 |

(1) Deuterium Substitution Rate at Position B1

The deuterium substitution rate at position B1 can be calculated as follows.

$$[D\%]_{B1} = 100 - \frac{(100-99.1)*1.00*10}{7.69*2} = 99.4\%$$

The calculation will be described in more detail as follows.

First, the average number of moles of protons remaining unsubstituted with deuterium in the deuterium-substituted anthracene is calculated.

$$[mol]_a = \frac{A}{H}$$

$[H\%]_{B1}$ remaining unsubstituted with deuterium at position B1 is calculated.

$$[H\%]_{B1} = \frac{(100-[D\%]*A_{B1})}{[mol]_a * H_{B1}} = \frac{(100-[D\%])*A_{B1}*H}{A*H_{B1}}$$

Then, the deuterium substitution rate (%) at B1 is calculated by subtracting the above value from 100.

$$[D\%]_{B1} = 100 - [H\%]_{B1}$$

In the same way, the deuterium substitution rates at position A1 and position A2 can be calculated as follows.

(2) Deuterium Substitution Rate at Position A1

$$[D\%]_{A1} = 100 - \frac{(100-99.1)*4.33*10}{7.69*4} = 98.7\%$$

(3) Deuterium Substitution Rate at Position A2

$$[D\%]_{A2} = 100 - \frac{(100-99.1)*2.36*10}{7.69*4} = 99.3\%$$

What is claimed is:

1. A method for determining the deuterium substitution rate of a deuterium-substituted sample according to substitution positions, comprising:

obtaining a $^1$H-NMR spectrum of the deuterium-substituted sample (step 1); and calculating a deuterium substitution rate ($[D\%]_p$) of the deuterium-substituted sample according to substitution positions from the following Equation 1 using information of the $^1$H-NMR spectrum (step 2):

$$[D\%]_p = 100 - ((100-[D\%]) \times A_p \times H)/(A \times H_p) \quad \text{[Equation 1]}$$

wherein, in Equation 1,

[D%] is an average deuterium substitution rate of the deuterium-substituted sample, $A_p$ is an integration value of a peak at the position in the $^1$H-NMR spectrum, H is a total number of hydrogens in the deuterium-substituted sample before deuterium substitution, A is a sum of integration values of each peak in the $^1$H-NMR spectrum, $H_p$ is a number of hydrogens at the position in the deuterium-substituted sample before deuterium substitution.

2. The method of claim 1, wherein the deuterium-substituted sample is a sample in which deuterium is substituted in at least one position where hydrogen is substituted in a molecular structure.

3. The method of claim 1, wherein the deuterium-substituted sample has two or more positions where hydrogen is substituted in a molecular structure.

4. The method of claim 1, wherein the deuterium-substituted sample is deuterium-substituted anthracene.

5. The method of claim 1, wherein the average deuterium substitution rate of the deuterium-substituted sample is obtained by an analysis method of MS, GC/MS, or HPLC.

* * * * *